April 7, 1925.
F. MARKWICK
1,532,425
TIRE AND COMBINATION TIRE PROTECTOR AND ANTISKID DEVICE
Filed May 17, 1923 4 Sheets-Sheet 1
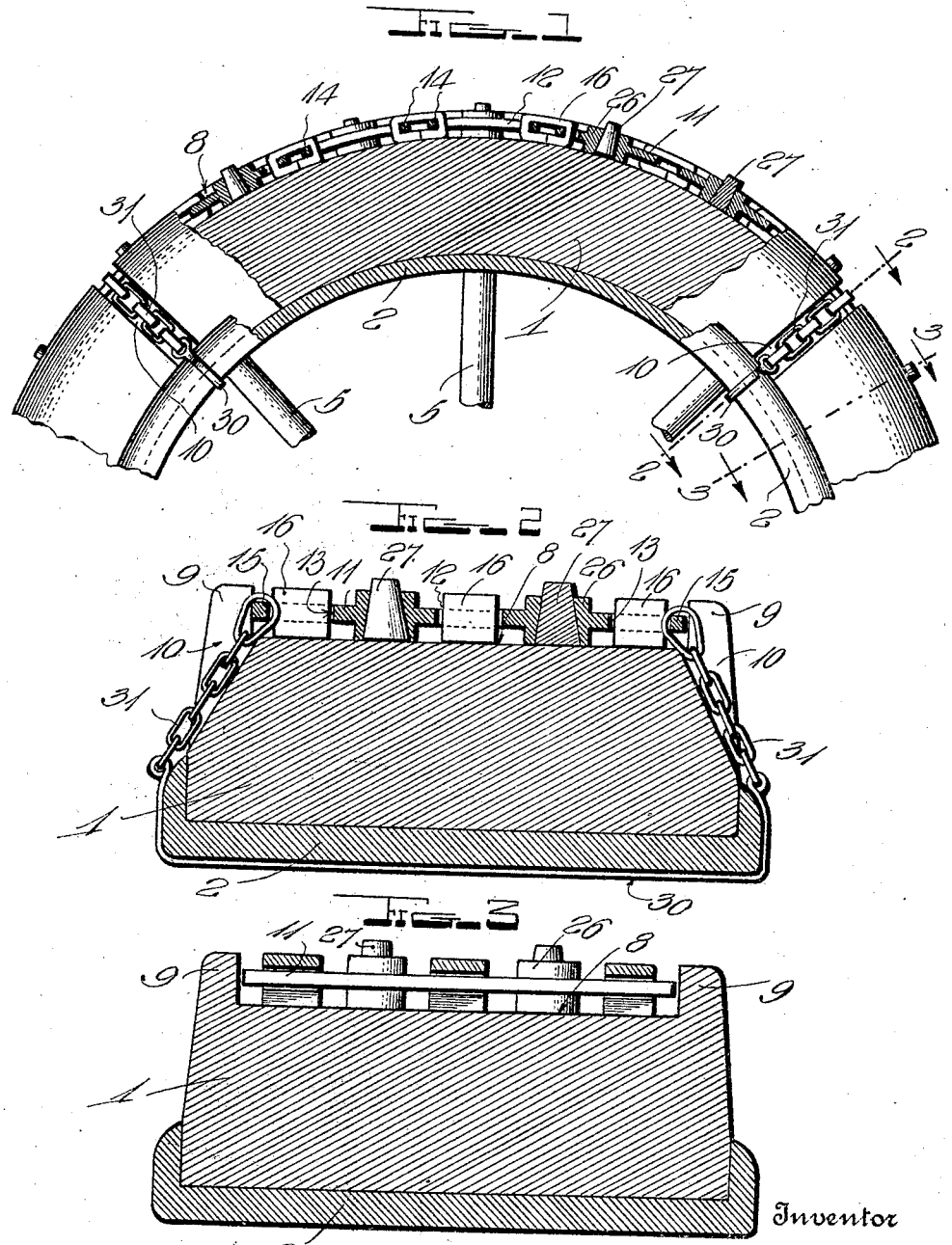

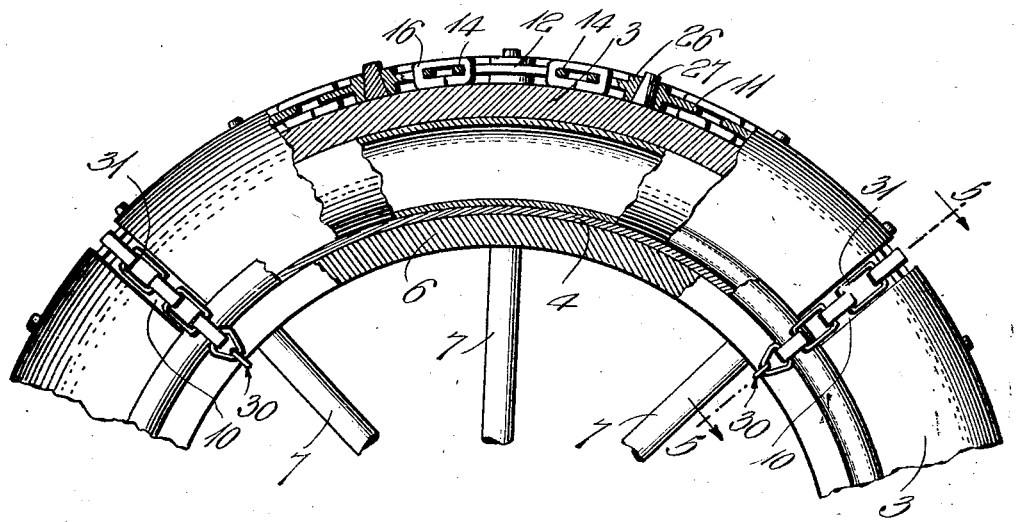
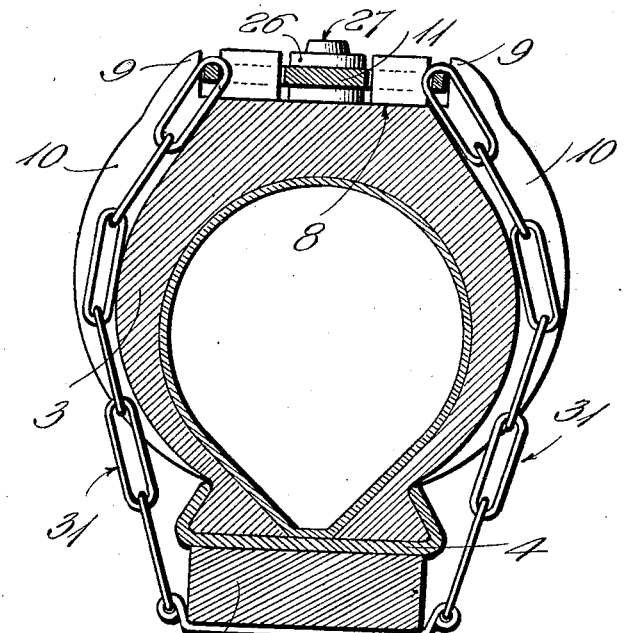

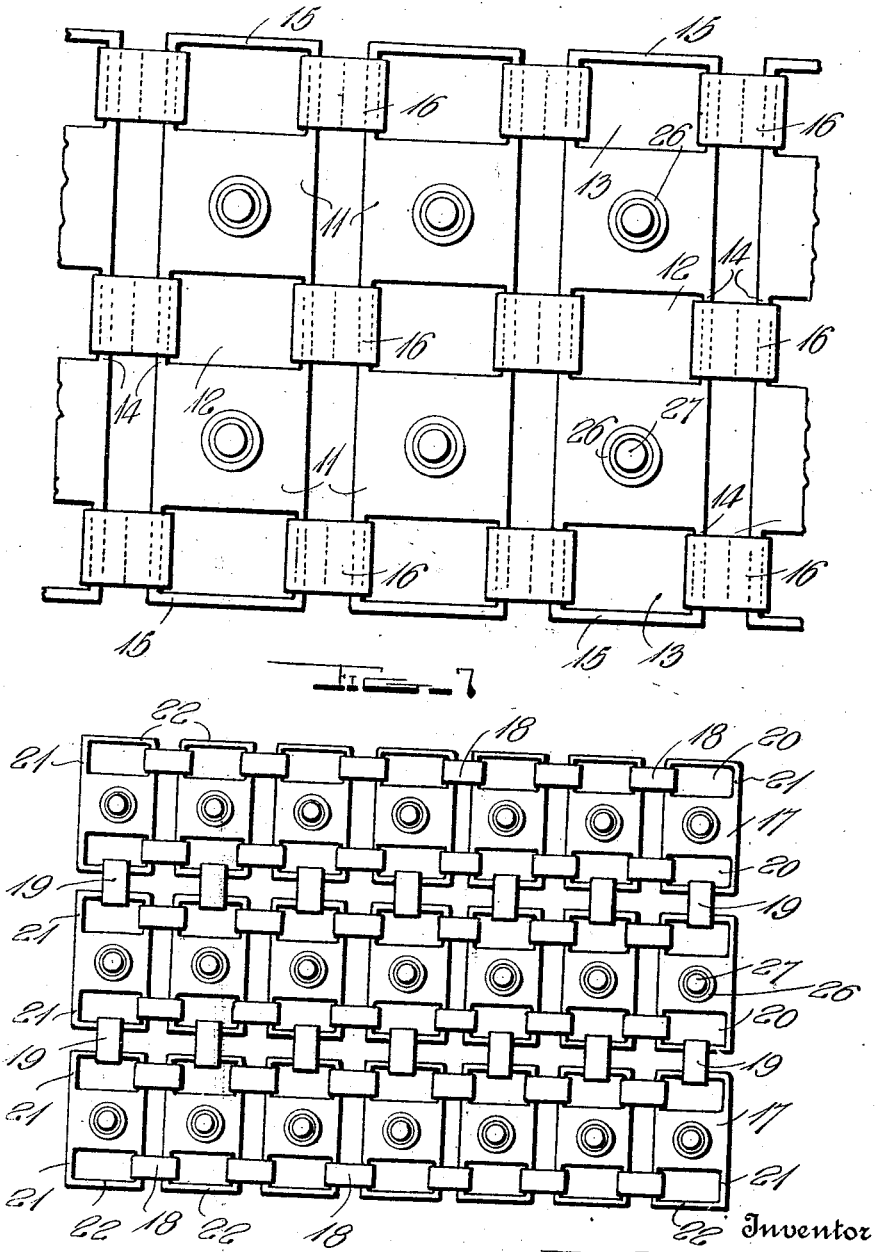

April 7, 1925.
F. MARKWICK
1,532,425
TIRE AND COMBINATION TIRE PROTECTOR AND ANTISKID DEVICE
Filed May 17, 1923     4 Sheets-Sheet 4
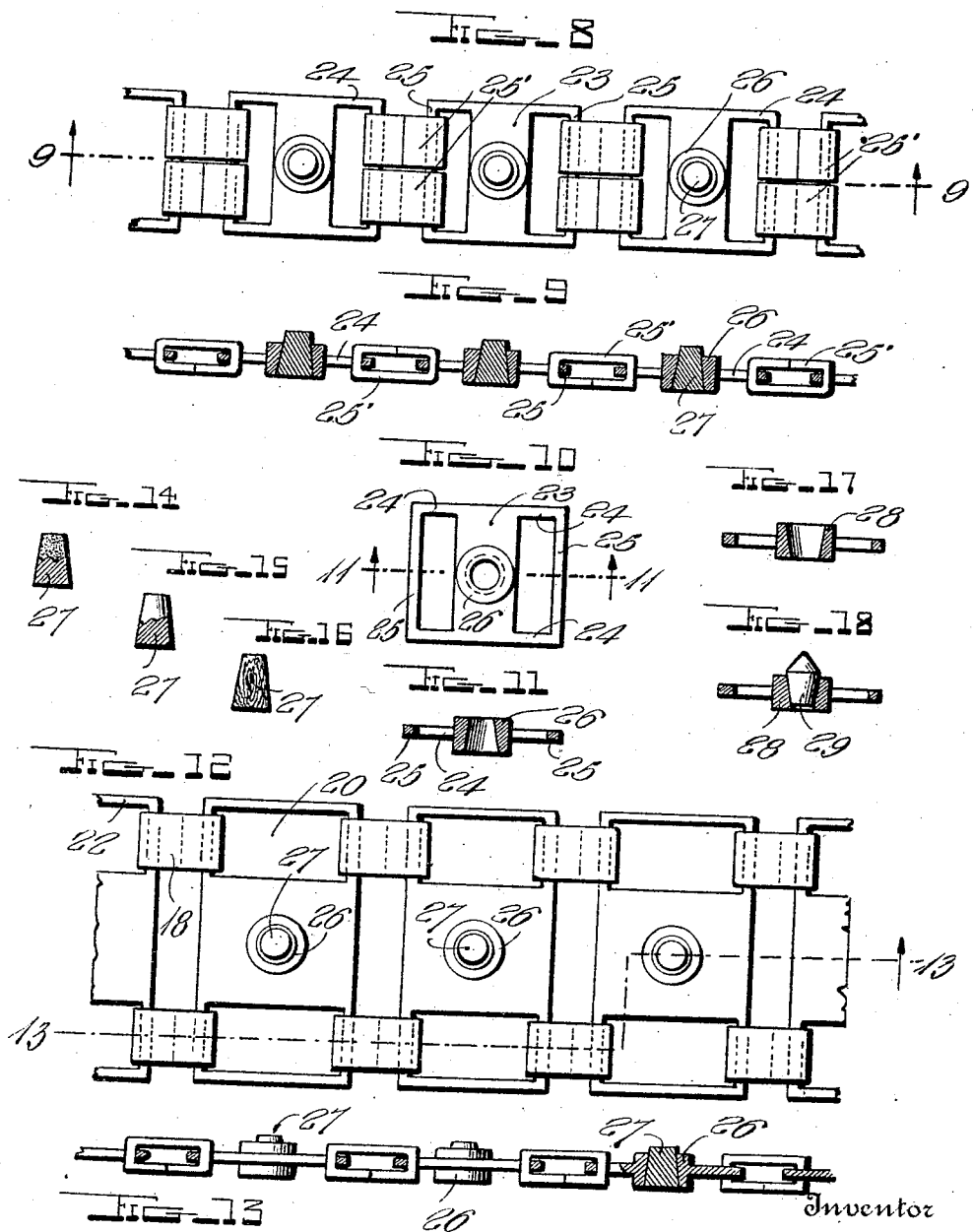

Patented Apr. 7, 1925.

1,532,425

UNITED STATES PATENT OFFICE.

FRED MARKWICK, OF DETROIT, MICHIGAN.

TIRE AND COMBINATION TIRE PROTECTOR AND ANTISKID DEVICE.

Application filed May 17, 1923. Serial No. 639,590.

*To all whom it may concern:*

Be it known that I, FRED MARKWICK, a citizen of the United States, residing at Detroit, in the county of Wayne and State of Michigan, have invented certain new and useful Improvements in Tires and Combination Tire Protector and Antiskid Devices; and I do declare the following to be a full, clear, and exact description of the invention, such as will enable others skilled in the art to which it appertains to make and use the same.

This invention relates to an improved tire and device for protecting the tire from wear and for preventing skidding and permitting the tire to have a good grip upon soft and muddy roads.

One object of the invention is to provide a tire which is so constructed that the protecting device may fit into a circumferentially extending seat formed in the tire and be held against transverse movement and further held against movement circumferentially about the tire.

Another object of the invention is to so construct this tire that the means for retaining the protector in place may pass through side channels in the tire and thus constitute the means for holding the protector against movement circumferentially of the tire.

Another object of the invention is to so construct the attachment that it may be formed of a plurality of plates connected by links which will permit of the protector fitting snugly within the seat formed in the tread portion of the tire.

Another object of the invention is to so construct this protector that it may be formed of any desired width and of a suitable length by simply providing the proper number of plates and connecting links.

Another object of the invention is to provide the plates with improved calks which are to engage the ground and protect slipping, the plates having an improved construction of calk-receiving sockets and the sockets and the calks being so formed that the calks will be tightly wedged in the sockets so that they will be firmly in place but may be removed when desired and new ones put in place.

Another object of the invention is to provide a protector and anti-skid device which will serve not only to protect the tire against slipping but further serve to protect it from excessive wear and also protect it from being punctured.

This invention is illustrated in the accompanying drawings, wherein:—

Figure 1 is a view showing a portion of a wheel and tire, the view being partially in side elevation and partially in section and showing the improved protector and anti-skid device in place.

Figures 2 and 3 are transverse sectional views taken along the line 2—2 and 3—3 of Fig. 1.

Figure 4 is a view similar to Fig. 1 showing the invention applied to a pneumatic tire in place of a solid tire.

Figure 5 is a transverse sectional view taken along the line 5—5 of Fig. 4.

Figure 6 is an enlarged plan view showing a portion of the protecting device and disclosing one form of plate which may be used.

Figure 7 is a similar view showing another form of plate which may be used.

Figure 8 is a view similar to Figs. 6 and 7 and disclosing a form of protector which will be preferably used when the protector is to be used in connection with tires having a very narrow tread portion.

Figure 9 is a longitudinal sectional view taken along the line 9—9 of Fig. 8.

Figure 10 is a plan view of one of the plates shown in Fig. 8.

Figure 11 is a sectional view taken along the line 11—11 of Fig. 10.

Figure 12 is an enlarged plan view showing one of the rows of plates used in Fig. 7.

Figure 13 is a longitudinal sectional view taken along the line 13—13 of Fig. 12.

Figures 14, 15 and 16 are views showing calks formed of different materials.

Figure 17 is a sectional view through a plate provided with a modified form of calk-receiving seat.

Figure 18 is a view similar to Fig. 17 with a calk fitting into the calk-receiving seat.

The tire which may be a solid tire such as used upon trucks or a pneumatic tire such as may be used upon pleasure cars will be carried by a conventional structure of tire-carrying rim. In Figs. 1, 2 and 3, the tire has been indicated by the numeral 1 and the rim by the numeral 2, and in Figs. 4 and 5, the pneumatic tire has been indicated by the numeral 3 and the rim by the numeral 4. The rim shown in Figs. 1, 2 and 3 will be directly engaged by the spokes 5 of the wheel, whereas in Figs. 4 and 5 this rim fits upon the felly 6 which is engaged with the outer ends of the spokes 7. The tire which, as previously explained may be a solid tire or a pneumatic tire has its tread portion recessed to provide a circumferentially extending seat 8 and side ribs or flanges 9 and the tire has its side walls provided with channels 10 which extend radially of the wheel and tire and communicate with opposite side portions of the channel 8. By providing the circumferentially extending seat in the tread portion of the tire and the radially extending channels 10 in the side portions, the protector and anti-skid device may be put in place about the tire and this protector will be held against transverse movement with only the calks extending beyond the side ribs 9. When the fasteners are put in place, they will fit within the channels and will serve not only to hold the protector in place about the tire but will also serve to prevent it from moving circumferentially of the tire.

The protector and anti-skid device will be formed as a strip or pad which will be of the proper length to extend about the tire and of the proper width to fit snugly in the seat 8 between the side ribs or flanges 9. This pad or strip will be formed of a plurality of plates which may be of the proper width to just fit between the ribs 9 as shown in Figs. 6 and 8 or it may be formed of a plurality of rows of plates which when connected by the links will form a pad of the proper width. The plates 11 which are used in the form shown in Fig. 6 are elongated and extend transversely of the pad or strip and each is provided intermediate its length with a cutout 12 and adjacent its ends with cutouts 13 thus providing side bars 14 and end bars 15. These side bars 14 are engaged by the flat links 16 and it will be readily seen that a pad will be provided in which the plates will be connected in a very efficient manner but at the same time will be permitted to have sufficient movement towards and away from each other to cause easy riding. The end bars have been provided so that in case it is desired to use pads of this type with very wide truck wheels, two or more of the strips may be used and the strips connected by links which will be similar to the links 16 and will connect the ends bar 15 of adjacent plates of the pad.

In the form shown in Fig. 7, the pad is formed of a plurality of plates 17 which are shorter than the plates 11 and are arranged in rows, the plates of each row being connected by links 18 similar to the links 16 and the rows of plates being connected by links 19. Each of the plates 17 has its end portions provided with cutouts 20 thus forming side bars 21 and end bars 22 for engagement by the links 18 and 19. It will be obvious that the pad or strip may be formed of any length desired and of any width by simply multiplying the number of plates in a row and providing the desired number of rows.

In Fig. 8, there has been shown a modified construction for use in connection with a tire having a very narrow tread which will have a seat of only sufficient width to receive one row of plates. These plates 23 are similar to the plates 17 but instead of the links 18 being provided to engage side bars 21, the plates will be positioned with the side bars 24 extending longitudinally of the strip or pad and the end bars 25 will be connected by a plurality of links 25'. In the present illustration, two links 25' have been provided to connect each pair of plates and in the preferred form, the links will be put in place with one link having its unconnected ends positioned externally of the pad and the other link with its unconnected ends positioned internally to engage the tread of the tire. It will be understood however that both the links may be made solid or with their ends welded when the device is constructed for use on trucks or heavy cars. It should be also noted that in this specific type the portion of the plate between the cutout is narrower than in the form shown in Figs. 6 and 17 and in Fig. 12.

It is desired to have this device obtain a very good grip upon a muddy road or wet pavement and therefore each of the plates has been provided with a calk-receiving socket 26 which is positioned intermediate the cutouts and extends beyond the inner and outer faces of the plates. These sockets have thick walls as shown in the sectional views and it would be noted that these sockets are tapered as shown clearly in Figs. 11 and 17 so that the calks may be wedged into place and thus prevented from working loose. In the specific form shown in Fig. 11, the socket tapers outwardly and the calks 27 will have a similar taper so that they may be passed into the sockets from the inner ends thereof and forced outwardly until firmly seated. When in place, the inner ends of the calks will be flush with the inner ends of the sockets as shown in Fig. 9 so that they will not dig into the tread portion of the tire but the outer ends of the calks will extend so that they may have a good grip upon the road or pavement. These calks may be formed of any suitable material and in Figs. 14, 15 and 16, they have been shown formed respectively of rubber, metal and wood.

In the form shown in Figs. 17 and 18, there has been shown a modified form of socket and calk in which the socket tapers inwardly instead of outwardly and the calk is similarly tapered and is inserted from the outer end of the socket instead of the inner end. It should be further noted that this calk 29 has its outer end portion tapered to a point. These calks 29 will be preferably formed of steel and have been given the shape disclosed so that they can have a very firm grip upon a road which may be covered with ice or may be frozen into a hard mass.

When this protecting pad or strip is put in place, it is passed about the tire within the seat 8 and will have its ends secured by links similar to those which connect the plates forming the pad. It is of course obvious that any other form of fastener may be employed if so desired. After the pad or strip has been secured about the tire, the yokes 30 will be put in place across the rim 2 or felly 6 as shown in Figs. 2 and 5, and the chains 31 will be extended through the channels 10 and connected with the plates of the pad at the sides thereof. These chains and yokes will serve to hold the pad in place about the wheel and will further serve to prevent the pad from having undesired movement circumferentially about the wheel.

From an inspection of Figs. 2, 3 and 5, it will be readily seen that when the pad is put in place, it will serve to protect the tire from direct contact with the road and therefore the tire will be prevented from becoming unduly worn.

These protectors are intended to be kept upon the tires at all times, but it will be obvious that the calks may be removed and different ones put in place according to the conditions of the weather.

I claim:

1. A tire having its tread portion provided with an anti-skid chain receiving seat extending circumferentially about the tire and having the side portions of the tire provided with channels communicating with the chain seat to receive anchoring means for the anti-skid chain.

2. The combination with a tire having its tread portion provided with a circumferential seat and its side portions provided with channels communicating with said seat, of an anti-skid device positioned in said seat, and anchoring means connected with said anti-skid device and engaged with said channels.

3. The combination with a tire having its tread portion provided with a seat extending circumferentially of the tire and of less width than the tread, the side portions of the tire being provided with channels extending radially and communicating with the said seat, of an anti-skid device positioned in said seat and extending about the tire, and anchoring means for said anti-skid device including yokes for extending transversely across a tire carrying rim, and means for extending through said channels and connecting the end portions of said yokes with opposite side portions of said anti-skid device.

4. The combination with a tire having its tread portion provided with a seat extending circumferentially of the tire and of less width than the tread, the side portions of the tire being provided with channels extending radially and communicating with the said seat, of an anti-skid device positioned in said seat and extending about the tire, and anchoring means for said anti-skid device having portions extending through said channels and connected with opposite sides of the anti-skid device to hold the anti-skid device against movement circumferentially of the tire.

5. An anti-skid device comprising an elongated strip to be secured circumferentially about the tread portion of a tire, said strip being formed of a plurality of plates each having cutouts in its end portions to provide bars and each having a socket intermediate its length and width, ground engaging calks fitting into said sockets and projecting beyond the outer ends of the sockets, and links extending between the plates and engaging said bars to retain the plates in strip-forming relation to each other.

6. An anti-skid device comprising an elongated strip to be secured circumferentially about the tread portion of a tire, said strip being formed of a plurality of plates, sockets carried by said plates and extending beyond the inner and outer faces of the plates, calks fitting in said sockets and links connecting said plates in strip-forming relation to each other.

In testimony whereof I have hereunto affixed my signature.

FRED MARKWICK.